US012633311B2

(12) United States Patent
Lantz et al.

(10) Patent No.: US 12,633,311 B2
(45) Date of Patent: May 19, 2026

(54) PROVIDING A STIFFENER IN A TAPE REEL HUB TO REDUCE TAPE DIMENSIONAL STABILITY ERRORS

(71) Applicant: INTERNATIONAL BUSINESS MACHINES CORPORATION, Armonk, NY (US)

(72) Inventors: Mark Alfred Lantz, Adliswil (CH); Hugo E. Rothuizen, Oberrieden (CH); Simeon Furrer, Altdorf (CH); Beat Eugen Weiss, Edlibach (CH); Stella Brach, Oberrieden (CH); Luzius Kronig, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/618,589

(22) Filed: Mar. 27, 2024

(65) Prior Publication Data

US 2025/0308558 A1    Oct. 2, 2025

(51) Int. Cl.
  *G11B 23/037* (2006.01)
  *G11B 23/04* (2006.01)
  *G11B 23/107* (2006.01)

(52) U.S. Cl.
  CPC .......... *G11B 23/037* (2013.01); *G11B 23/044* (2013.01); *G11B 23/107* (2013.01)

(58) Field of Classification Search
  None
  See application file for complete search history.

(56) References Cited

U.S. PATENT DOCUMENTS

| | | | |
|---|---|---|---|
| 7,059,555 B2 | 6/2006 | Brown et al. | |
| 7,287,716 B2 | 10/2007 | Asano | |
| 7,300,016 B2 | 11/2007 | Brown et al. | |
| 10,529,370 B1 | 1/2020 | Bui et al. | |
| 11,423,940 B2 | 8/2022 | Moses | |
| 2002/0134875 A1* | 9/2002 | Zwettler et al. ..... | G11B 23/107 242/348.2 |
| 2003/0226924 A1* | 12/2003 | Morita ................. | G11B 23/107 242/613.4 |

(Continued)

FOREIGN PATENT DOCUMENTS

| | | |
|---|---|---|
| DE | 2259699 A1 | 6/1974 |
| JP | 2008159116 A | 7/2008 |

OTHER PUBLICATIONS

J. A. Wickert, "Width-Wise Variation of Magnetic Tape Pack Stresses," Journal of Applied Mechanics, May 2002, 13 pp.

(Continued)

*Primary Examiner* — Craig A. Renner
(74) *Attorney, Agent, or Firm* — Konrad Raynes Davda & Victor LLP; David Victor

(57) ABSTRACT
A tape cartridge reel comprises an upper flange, a lower flange, and a hollow cylinder hub between the upper flange and the lower flange. The upper flange has an upper opening at an upper end of the hollow cylinder hub. A hollow cylinder stiffener is positioned within the hollow cylinder hub. An inner surface is formed within the hollow cylinder hub and the hollow cylinder stiffener and extends from the upper end of the hollow cylinder hub to the lower end of the hollow cylinder hub. The inner surface forms a hollow space delimited by a surface of revolution with circular cross sections of different diameters.

22 Claims, 5 Drawing Sheets

(56)                    References Cited

U.S. PATENT DOCUMENTS

| 2004/0061015 | A1* | 4/2004 | Hiraguchi ............ | G11B 23/107 |
| | | | | 242/348 |
| 2004/0099762 | A1* | 5/2004 | Shiga ..................... | B65H 75/14 |
| | | | | 242/614 |
| 2005/0205708 | A1 | 9/2005 | Sasaki et al. | |
| 2005/0279874 | A1 | 12/2005 | Martin et al. | |
| 2007/0051845 | A1 | 3/2007 | Asano et al. | |
| 2007/0063085 | A1* | 3/2007 | Asano et al. ........ | G11B 23/107 |
| | | | | 242/348 |
| 2008/0011894 | A1 | 1/2008 | Sasaki et al. | |
| 2008/0173749 | A1* | 7/2008 | Shiga ................... | G11B 23/044 |
| | | | | 242/407 |
| 2009/0218430 | A1* | 9/2009 | Mori ................... | G11B 23/037 |
| | | | | 242/348 |
| 2009/0218431 | A1* | 9/2009 | Mori ............... | G11B 23/08728 |
| | | | | 242/348 |
| 2009/0250547 | A1* | 10/2009 | Higashisaka et al. ....................... | |
| | | | | G11B 23/08728 |
| | | | | 242/609 |

OTHER PUBLICATIONS

M.A. Lantz, et al., "Servo-Pattern Design and Track-Following Control for Nanometer Head Positioning on Flexible Tape Media," IEEE, IEEE Transactions on Control Systems Technology, vol. 20, No. 2, Mar. 2012, 13 pp.

International Searching Authority, "Notification of Transmittal of the International Search Report and the Written Opinion of the International Searching Authority, or Declaration," Patent Cooperation Treaty Jun. 16, 2025, 12 pages, International Application No. PCT/ IB2025/051754.

* cited by examiner

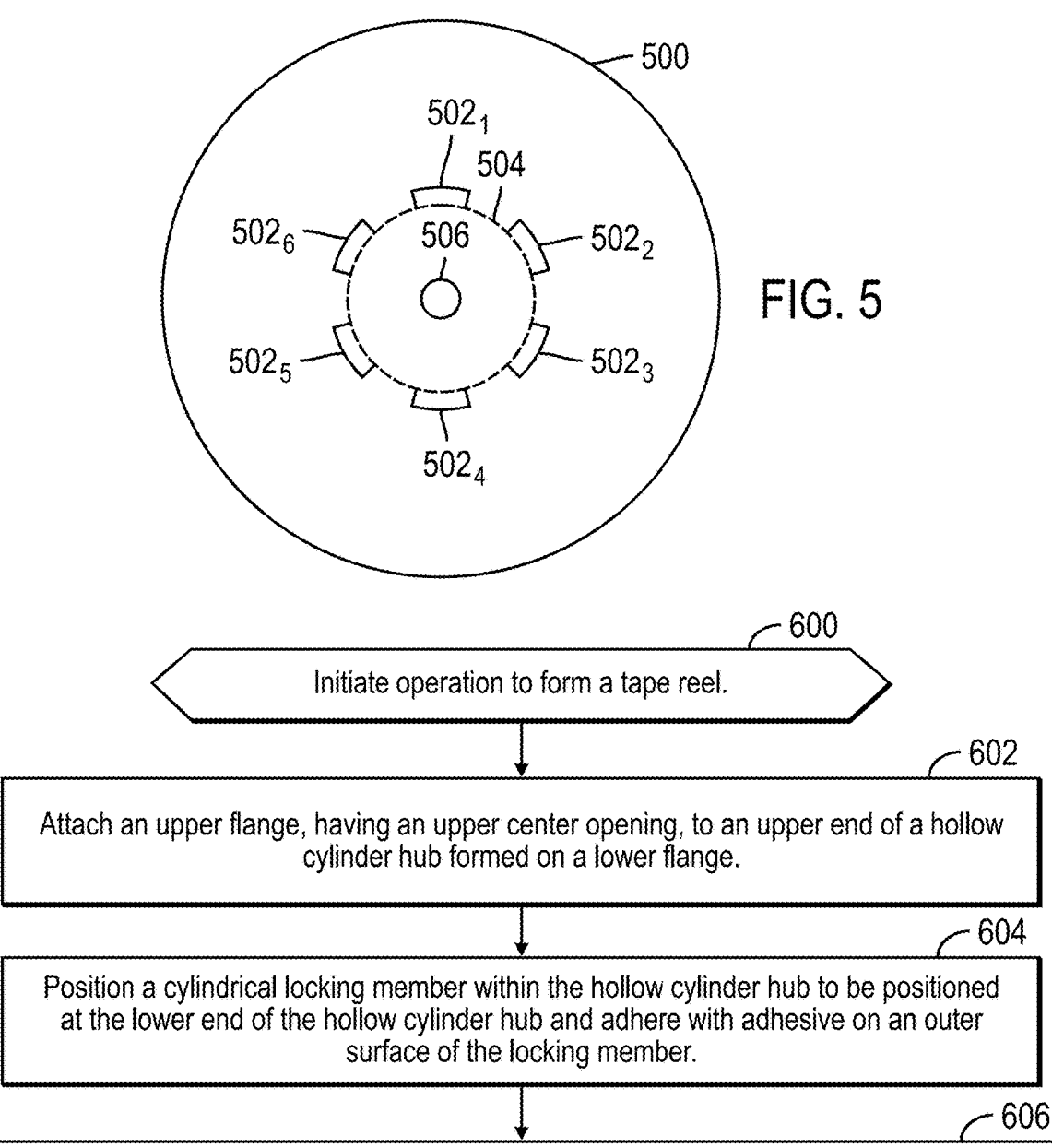

Initiate operation to form a tape reel.

602

Attach an upper flange, having an upper center opening, to an upper end of a hollow cylinder hub formed on a lower flange.

604

Position a cylindrical locking member within the hollow cylinder hub to be positioned at the lower end of the hollow cylinder hub and adhere with adhesive on an outer surface of the locking member.

606

Position a hollow cylinder stiffener within the hollow cylinder hub so that an upper end of the hollow cylinder stiffener is flush with the upper end of the hollow cylinder hub, and use adhesive to adhere outer surface of the hollow cylinder stiffer to inner surface of the hollow cylinder hub, wherein an inner surface is formed within the hollow cylinder hub and the hollow cylinder stiffener extending from the upper end of the hollow cylinder hub to the lower end of the hollow cylinder hub, wherein the inner surface forms a hollow space delimited by a surface of revolution with circular cross sections of different diameters.

FIG. 6

PROVIDING A STIFFENER IN A TAPE REEL HUB TO REDUCE TAPE DIMENSIONAL STABILITY ERRORS

BACKGROUND OF THE INVENTION

1. Field of the Invention

Provided are a tape cartridge reel, tape cartridge, and method for forming a tape cartridge reel that provides a stiffener in a tape reel hub to reduce tape dimensional stability errors.

2. Description of the Related Art

In magnetic storage systems, data is read from and written onto a magnetic tape recording medium utilizing magnetic read and write elements formed on a tape head. The tape medium may be wound onto a hub in a center of a tape reel in a tape cartridge. Tape technology continues to migrate towards thinner media substrates, lower winding tensions, and higher speeds to allow for higher track density to increase storage capacity.

A magnetic tape pack is formed by winding the tape media onto a hub of a tape reel. The hub will have a radial stiffness that varies across its width. As the tape media becomes thinner and tape density increases, the tape dimensional stability may be compromised by compressive stresses applied to the tape pack while wound on the hub of the tape reel. Uneven or excessive compressive stress within the tape reel can cause the tape layers to buckle in the tape packs radial direction and/or axial direction. These tension stresses to the tape medium may cause the dimensions of the tape to widen or become distorted, thus causing the track locations within the tape medium to be altered, which results in track misregistration errors.

SUMMARY

Provided are a tape cartridge reel, tape cartridge, and method for forming a tape cartridge reel that provides a stiffener in a tape reel hub to reduce tape dimensional stability errors. The tape cartridge reel comprises an upper flange, a lower flange, and a hollow cylinder hub between the upper flange and the lower flange. The upper flange has an upper opening at an upper end of the hollow cylinder hub. A hollow cylinder stiffener is positioned within the hollow cylinder hub. An inner surface is formed within the hollow cylinder hub and the hollow cylinder stiffener and extending from the upper end of the hollow cylinder hub to the lower end of the hollow cylinder hub. The inner surface forms a hollow space delimited by a surface of revolution with circular cross sections of different diameters.

Further provided is a tape cartridge reel, on which a magnetic tape medium is wound, included in a tape cartridge, comprises an upper flange having an upper center opening and a lower flange. Openings are formed in a surface of the lower flange. A portion of the surface of the lower flange extends between the openings. A hollow cylinder hub is positioned between the upper flange and the lower flange. The upper center opening is at an upper end of the hollow cylinder hub.

BRIEF DESCRIPTION OF THE DRAWINGS

FIG. 5 illustrates an embodiment of a lower flange having cut-out portions.

FIG. 6 illustrates an embodiment of operations to form a tape reel.

DETAILED DESCRIPTION

Figure 1:
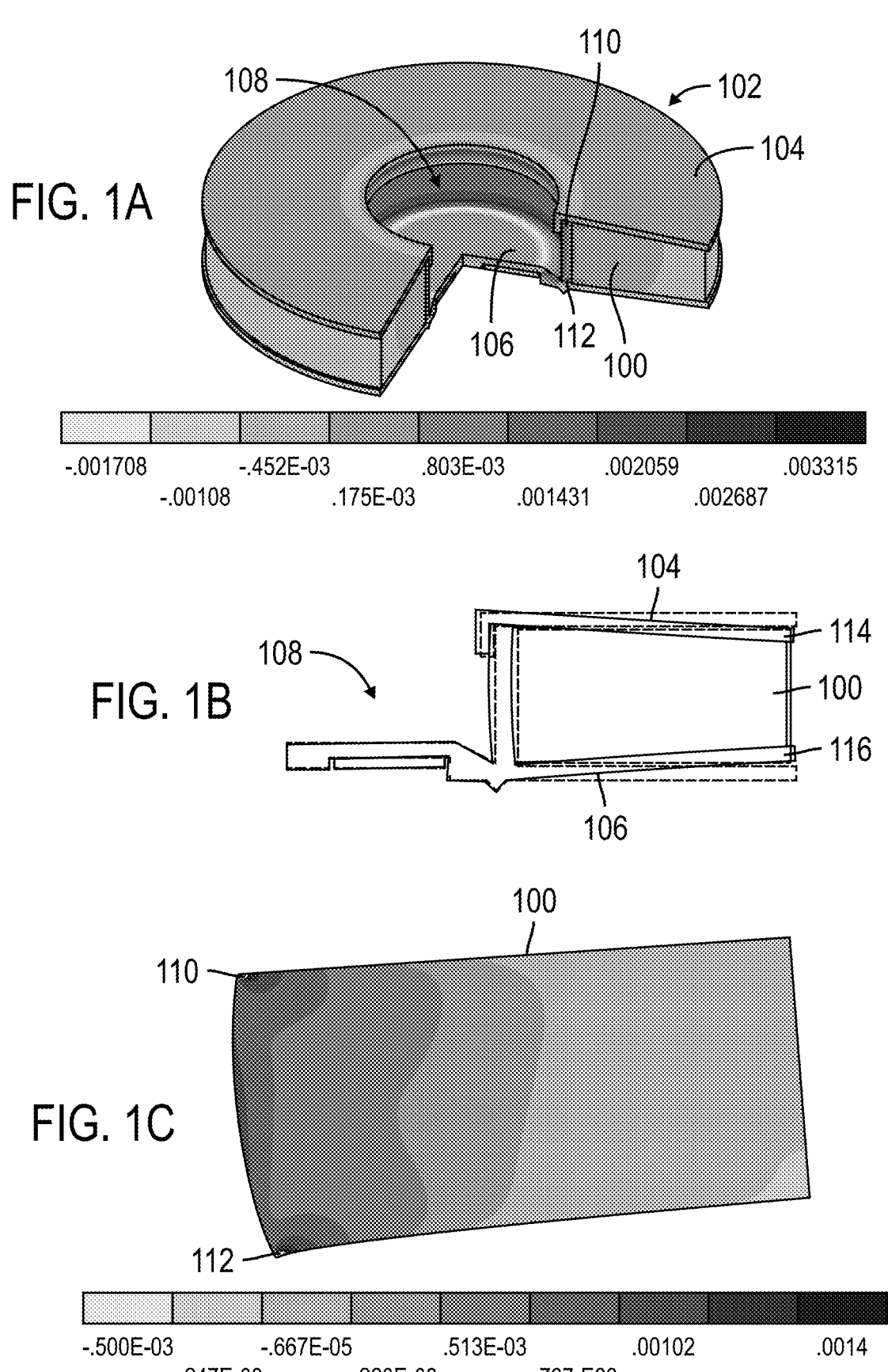
FIGS. 1A, 1B, and 1C illustrate tension maps of components in a tape reel and the tape medium, and how stress forces affect the tape medium and tape reel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A tape cartridge reel comprises an upper flange, a lower flange, and a hollow cylinder hub between the upper flange and the lower flange. The upper flange has an upper opening at an upper end of the hollow cylinder hub. A hollow cylinder stiffener is positioned within the hollow cylinder hub. An inner surface is formed within the hollow cylinder hub and the hollow cylinder stiffener and extends from the upper end of the hollow cylinder hub to the lower end of the hollow cylinder hub. The inner surface forms a hollow space delimited by a surface of revolution with circular cross sections of different diameters. Thus, embodiments advantageously provide a hollow cylinder stiffener to reinforce the hollow cylinder hub to significantly reduce the effect of hub collapse at the upper flange, and tape dimensional stability issues, resulting from the upper flange having an opening not present in the lower flange.

Example 2: The subject matter of Examples 1 and 3-7 can optionally include that the hollow cylinder stiffener comprises a ring positioned within the hollow cylinder hub at the upper end. An inner diameter of the ring has a smaller diameter than an inner diameter of the hollow cylinder hub. Thus, embodiments advantageously provide a ring for the hollow cylinder hub to reinforce the upper end of the hollow cylinder hub to eliminate the effect of hub collapse at the upper flange and to allow engagement with a locking mechanism that is inserted into the hub.

Example 3: The subject matter of Examples 1, 2 and 4-7 can optionally include that that the hollow cylinder stiffener is formed of a stiffener material that is more rigid than a hub material forming the hollow cylinder hub. Thus, embodiments advantageously provide that the hollow cylinder stiffener is formed of a more rigid material than the hub material to increase the rigidity at the upper end of the hub at the upper flange and prevent collapse of the hollow cylinder hub, which can result in non-linear distortions and non-linear tape dimensional stability (TDS) effects.

Example 4: The subject matter of Examples 1-3 and 5-7 can optionally include that the stiffener material comprises a metal and the hub material comprises a plastic. Thus, embodiments advantageously provide that the stiffener material comprising a metal is more rigid than the hub material comprising a plastic to prevent the collapse of the upper end of the hollow cylinder hub at the upper flange.

Example 5: The subject matter of Examples 1-4, 6, and 7 can optionally include that the hollow cylinder stiffener extends from the upper end of the hollow cylinder hub toward the lower end of the hollow cylinder hub. The hollow cylinder stiffer may include an upper portion at the upper end of the hollow cylinder hub having a first inner diameter and a lower portion that extends from the upper portion towards the lower end of the hollow cylinder hub. The lower portion has a second inner diameter that is greater than the first inner diameter. Thus, embodiments advantageously provide that the hollow cylinder stiffener provides greater support at the upper end of the hollow cylinder hub at the upper flange because the upper portion of the hollow cylinder stiffener has a smaller diameter than the lower portion of the stiffener at the lower end. Providing greater support at the upper portion of the hollow cylinder hub at the upper flange eliminates hub collapse which tends to occur at the upper end due to the upper opening in the upper flange.

Example 6: The subject matter of Examples 1-5 and 7 can optionally include a locking member positioned in the hollow cylinder hub. The hollow cylinder stiffener extends from the upper end of the hollow cylinder hub to an upper surface of the locking member. Thus, embodiments advantageously provide that the hollow cylinder stiffener extends only so far as the locking member to not interfere with the locking member being positioned within the hollow cylinder hub.

Example 7: The subject matter of Examples 1-6 can optionally include that the hollow cylinder stiffener is tapered and has an upper diameter at an upper end of the hollow cylinder stiffener toward the upper end of the hollow cylinder hub and a lower diameter at a lower end of the hollow cylinder stiffener toward the lower end of the hollow cylinder hub. The lower diameter is greater than the upper diameter. Thus, embodiments advantageously provide that the hollow cylinder stiffener provides greater support at the upper with the tapered shape that has a smaller opening at the hub end at the upper flange upper end than the lower end of the hub which has a larger opening. Providing greater support at the upper end of the hollow cylinder hub eliminates hub collapse which tends to occur at the upper end due to the upper opening in the upper flange.

Example 8: A tape cartridge reel, on which a magnetic tape medium is wound, included in a tape cartridge, comprises an upper flange having an upper center opening and a lower flange having openings formed in a surface of the lower flange. A portion of the surface of the lower flange extends between the openings. A hollow cylinder hub is positioned between the upper flange and the lower flange. The upper center opening is at an upper end of the hollow cylinder hub. Thus, embodiments advantageously provide that openings formed in a surface of the lower flange reduce the rigidity of the lower flange relative to the upper flange to reduce the stress on the tape pack resulting from the disparity in rigidity between the upper flange and lower flange due to the upper flange having an upper opening.

Example 9: The subject matter of Examples 8, 10, and 11 can optionally include that the openings formed in the lower flange surround a center of the lower flange. Thus, embodiments advantageously provide a uniform reduction in rigidity around the center of the lower flange to reduce the likelihood of collapse of the upper end of the hollow cylinder hub at the upper flange.

Example 10: The subject matter of Examples 8, 9, and 11 can optionally include that the openings on the lower flange are positioned outside of a circumference of a center of the hollow cylinder hub positioned on the lower flange. Thus, embodiments advantageously provide a uniform reduction in rigidity distributed evenly around a circumference of the center of the hollow cylinder hub on the lower flange to reduce the greater rigidity of the lower flange with respect to the upper flange. This uniform reduction in rigidity of the lower flange reduces the likelihood of collapse of the upper end of the hollow cylinder hub.

Example 11: The subject matter of Examples 8-10 can optionally include a hollow cylinder stiffener positioned within the hollow cylinder hub and an inner surface formed within the hollow cylinder hub and the hollow cylinder stiffener and extending from the upper end of the hollow cylinder hub to a lower end of the hollow cylinder hub through the hollow cylinder stiffener. Thus, embodiments advantageously further reduce the likelihood of collapse of the upper end of the hollow cylinder structure by providing an additional support structure in the form of the hollow cylinder stiffener that provides additional rigidity at the upper end of the hub to reduce likelihood of collapse or deformation at the upper end of the hub.

Example 12 comprises a tape cartridge including the tape reel of any of Examples 1-11.

Example 13: A method for forming a tape cartridge reel. An upper flange is attached to a hollow cylinder hub attached to a lower flange. The upper flange has an upper opening at an upper end of the hollow cylinder hub. A hollow cylinder stiffener is positioned within the hollow cylinder hub. An inner surface is formed within the hollow cylinder hub and the hollow cylinder stiffener and extends from the upper end of the hollow cylinder hub to the lower end of the hollow cylinder hub. The inner surface forms a hollow space delimited by a surface of revolution with circular cross sections of different diameters. Thus, embodiments advantageously for a tape reel by positioning a hollow cylinder stiffener within the hollow cylinder hub to reinforce the hollow cylinder hub to significantly reduce the effect of hub collapse at the upper flange, and tape dimensional stability issues, resulting from the upper opening in the upper flange.

Example 14: The subject matter of Examples 13 and 15-18 can optionally include using an adhesive to adhere an outer surface of the hollow cylinder stiffener to a portion of the inner surface of the hollow cylinder hub. Thus, embodiments advantageously adhere the hollow cylinder stiffener to the inner surface of the hollow cylinder hub to ensure the stiffener remains in position to reduce the effect of hub collapse at the upper flange.

Example 15: The subject matter of Examples 13, 14, and 16-18 can optionally include positioning a cylindrical locking member within the hollow cylinder hub at the lower end of the hollow cylinder hub. The hollow cylinder stiffener is positioned within the hollow cylinder hub after positioning the cylindrical locking member within the hollow cylinder hub. Thus, embodiments advantageously insert the hollow cylinder stiffener within the hub after positioning the locking member in the hub to allow insertion of the locking member in cases where inserting the hollow cylinder stiffener first would preclude insertion of the locking member Example 16: The subject matter of Examples 13-15, 17, and 18 can optionally include that hollow cylinder stiffener is positioned within the hollow cylinder hub to have the upper end of the hollow cylinder stiffener located flush with the upper end of the hollow cylinder hub. Thus, embodiments advantageously provide that the hollow cylinder stiffener provides greater support at the upper end of the hollow cylinder hub at the upper flange. Providing greater support at the upper portion of the hollow cylinder hub at the upper flange eliminates hub collapse which tends to occur at the upper end due to the opening at the upper flange.

Example 17: The subject matter of Examples 13-16 and 18 can optionally include that the hollow cylinder stiffener comprises a ring positioned within the hollow cylinder stiffener at the upper end of the hollow cylinder hub. An inner diameter of the ring has a smaller diameter than an inner diameter of the hollow cylinder hub. Thus, embodiments advantageously position a ring in the hollow cylinder hub to reinforce the upper end of the hollow cylinder hub to eliminate the effect of hub collapse at the upper flange and to allow engagement with a locking mechanism that is inserted into the hub.

Tape media wound in a tape reel, referred to as the tape pack, experiences various non-linear stresses that compromise tape dimensional stability (TDS). Modeling of tape pack stresses indicate an asymmetry in the real design that results in an asymmetric deformation of the hub or hub collapse, which leads to a non-uniform stress distribution across the width of the tape, which in turns leads to non-linear creep. This non-uniform stress distribution alters the width or dimensions of the tape in a non-linear fashion.

FIG. 1A illustrates a stress map showing stress on a wound tape pack 100 on a tape reel 102 comprised of an upper flange 104 and a lower flange 106. The region of the tape pack 100 closest to the hub 108 experiences a greater level of deformation and stress than sections of the tape further away from the hub. The regions of the tape 100 experiencing the greatest level of deformation are at the upper 110 and lower 112 corner ends of the flanges 104 and 106, respectively. Force exerted on the hub 108 causes the hub 108 to deform elastically due to the asymmetric design of the hub having a large opening in the upper flange 104 and a continuous piece of support on the lower flange 106 across the lower end of the hub 108. In this way the bottom of the hub 108 is stiffer than the top of the hub, which causes the top of the hub 108 structure to collapse toward the center.

This deformation at the top of the hub 108 places stress on the wound tape 100 in a non-linear fashion, where the stress decreases moving away from the hub 108. These stress changes cause non-linear distortion of the width of the tape pack 100, resulting in a non-linear TDS.

FIG. 1B provides a further view of the deformation, with tension resulting from the hub collapse 108 causing the upper 104 and lower 106 flanges to collapse inward toward the tape pack 100. The flange tips 114, 116 move closer together as a result of the tension.

FIG. 1C illustrates a further stress map of the tape pack 100, where the corners 110 and 112 closest to the upper edges of the hub 108 have the highest level of stress and deformation. FIG. 1C further shows how the tension on the tape pack 100 decreases in a non-linear sashing moving away from the hub 108.

Described embodiments provide improvements to the tape reel structure to reduce deformation of the tape pack by increasing the relative rigidity of the upper flange to the lower flange to provide a more even distribution of stress to the tape pack. Described embodiments reenforce the upper flange by positioning a hollow cylinder stiffener in the hollow cylinder hub to help prevent hub collapse. By reinforcing the hub, the effect of hub collapse in causing non-linear stress that compromises tape dimension stability is significantly reduced if not eliminated. Minimizing non-linear stress eliminates a negative impact on tape dimensional stability that is difficult to correct otherwise.

Figure 2:
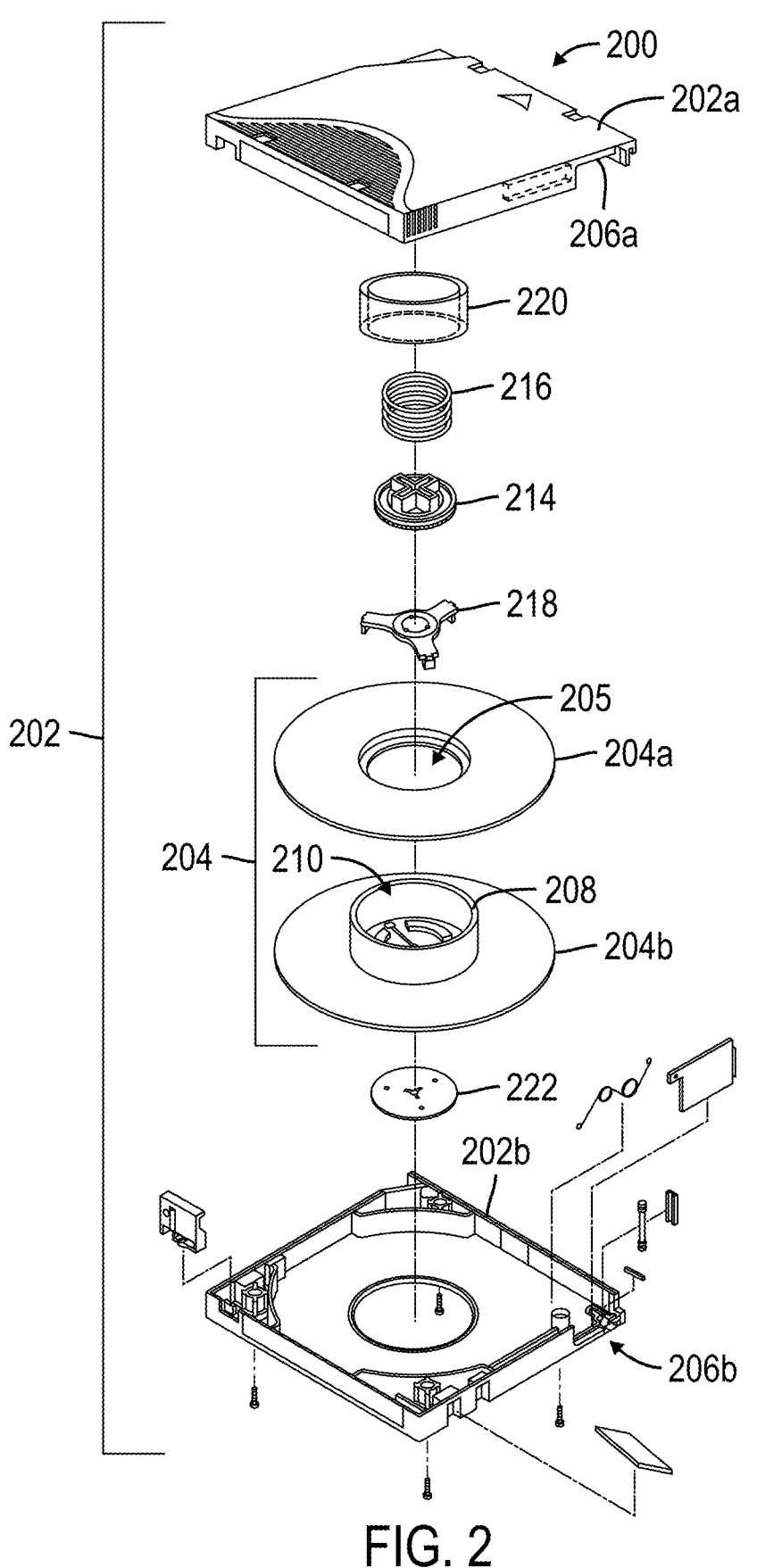
FIG. 2 illustrates an exploded view of the components of a tape cartridge.

FIG. 2 provides an exploded view of an embodiment of a tape cartridge assembly 200 having a case main body 202 constructed of an upper case 202a and a lower case 202b that engage one another. The case main body 200 encloses a tape reel 204 comprising an upper flange 204a, having a center opening 205, and a lower flange 204b. The case main body 202 encloses the tape reel 204 in an internal space formed when the upper case 202a and the lower case 202b engage one another so that the tape reel 204 is rotatable. Cutaway parts 206a, 206b, which form a tape withdrawal opening for withdrawing the magnetic tape wound around the tape reel 204 to the outside, are respectively formed in the upper case 202a and lower case 202b.

The tape reel 204 includes a hub 208 shaped as a hollow cylinder with an opening formed at an upper end 210. The inner surface of the hub 208 includes gear teeth (not shown) to engage a locking member 214 energized by a brake spring 216 positioned within the hub 208. A brake releasing plate 218 is positioned in the hub 208. A hollow cylinder stiffener 220 is positioned in the hub 208 to be positioned above the locking member 214 to provide a support structure to prevent the collapse of the hub 208 and non-linear stress on the tape pack.

A metal plate 222 is attached to an outer surface (lower surface) of the base of the hub 208, so that a drive shaft of a drive apparatus, not shown, and the tape reel 204 can be chucked by magnetic attraction. In one embodiment, the lower flange 204b is integrally formed with the lower end of the hub 208. The hub 208 and the upper flange 204a may be fixed together by ultrasonic welding.

In certain embodiments, the tape cartridge 200 may comprise a Linear Tape Open (LTO) compatible tape cartridge to be used with an LTO tape drive. In alternative embodiments, the tape cartridge 200 may be used for tapes to store data other than the LTO format.

Figure 3:
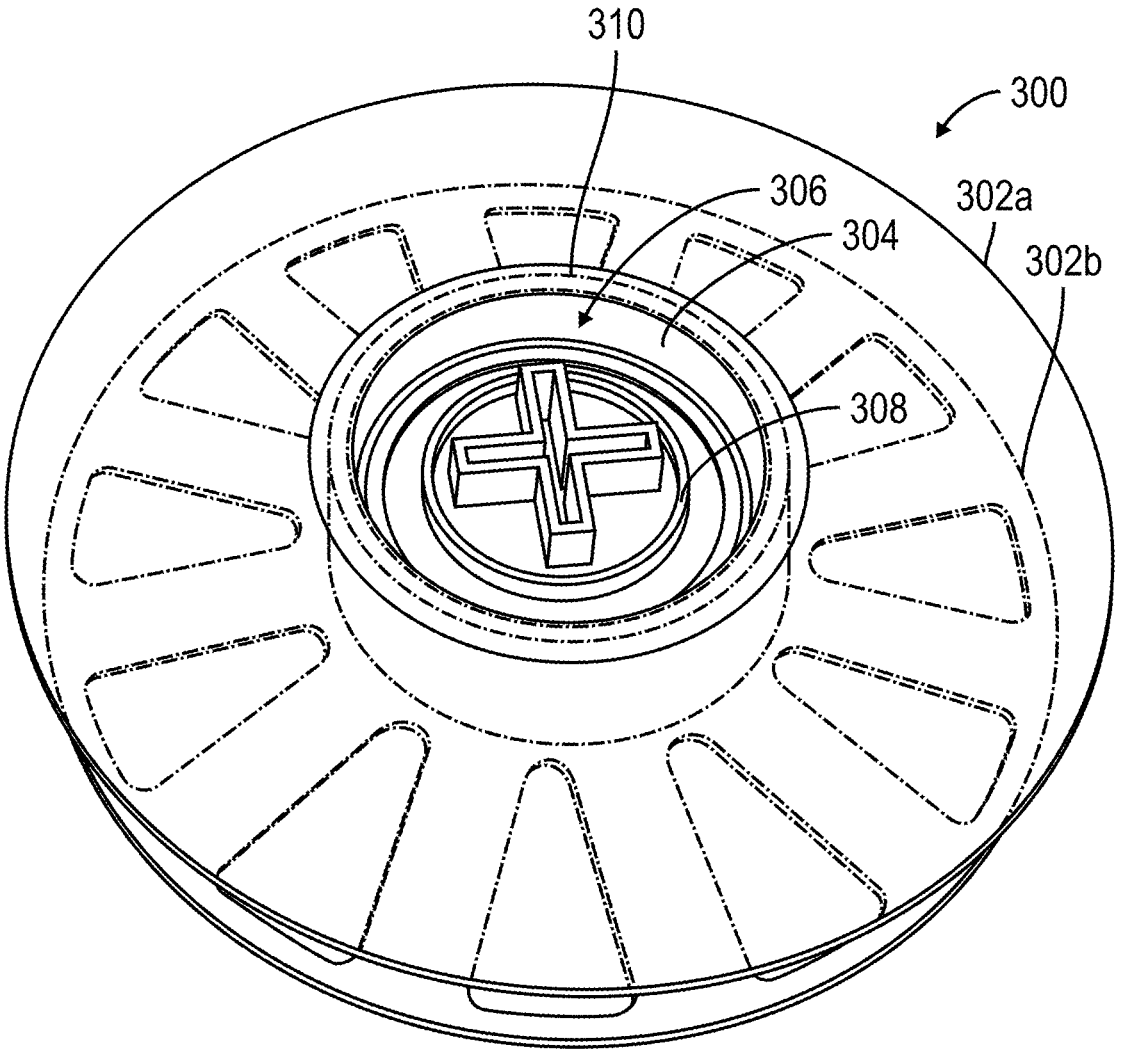
FIG. 3 illustrates an embodiment of a tape reel.

FIG. 3 illustrates an embodiment of a tape reel 300 with an upper flange 302a and lower flange 302b. A hollow cylinder metal stiffener 304 is positioned in the hub 306 above the locking member 308 to provide support for the inner walls of the hub 306 to prevent collapse. The stiffener 304 may be attached to an inner wall 310 of the hub 306 using an adhesive.

FIGS. 4A, 4B, 4C, and 4D provide cross-sections of the hub and flanges taken along a vertical axis to show different configurations and embodiments of the hollow cylinder stiffener with respect to the hollow cylinder hub. In the configurations, the inner space formed by the walls of the stiffener is of sufficient diameter to accommodate the braking components of the cartridge, including 214, 216, 218 shown in FIG. 2

Figures 4A, 4B, 4C, 4D:
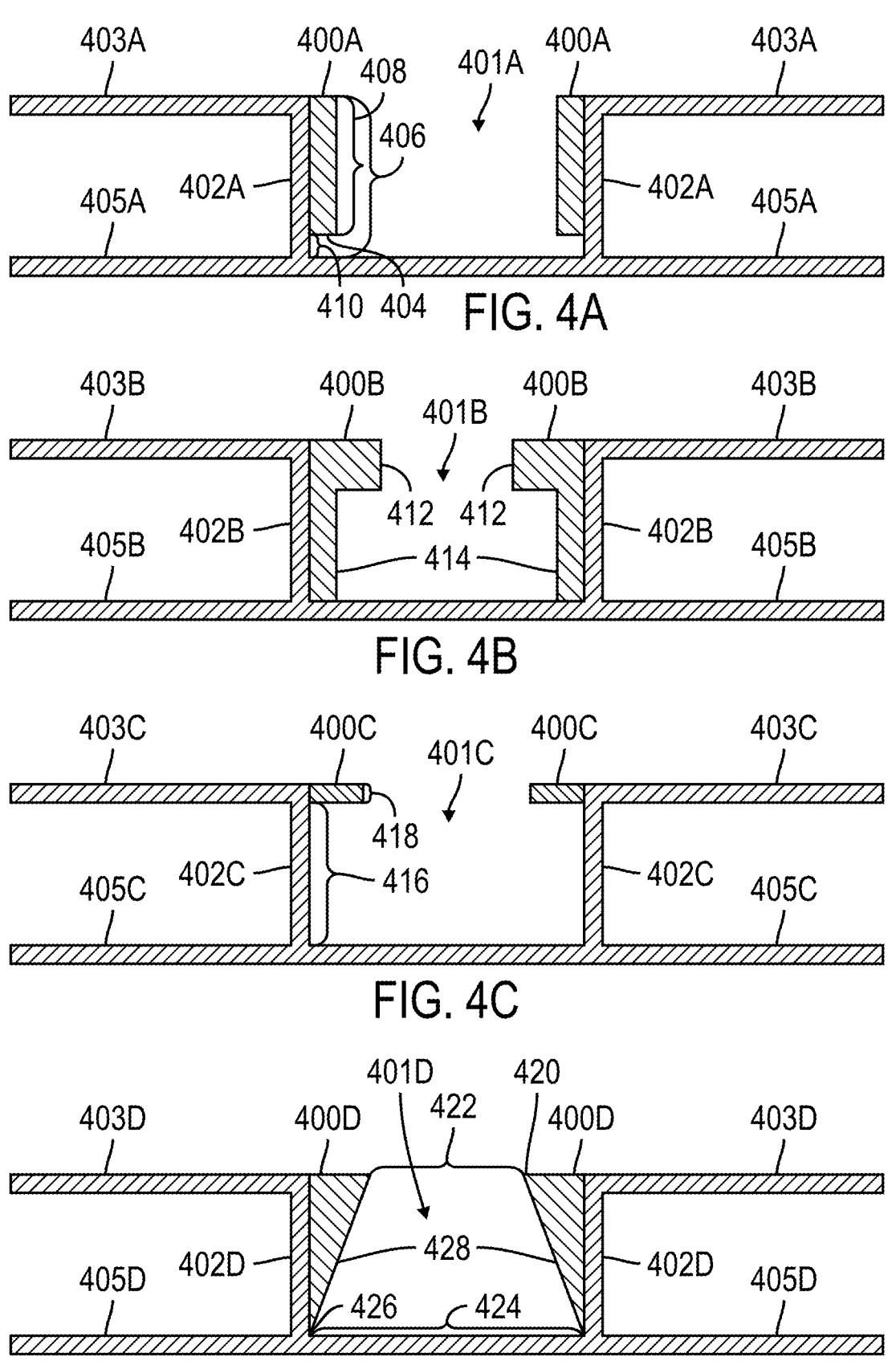
FIGS. 4A, 4B, 4C, and 4D illustrate embodiments of different configurations of a stiffener in the tape reel hub.

In FIG. 4A, the hollow cylinder stiffener 400A is positioned in the hollow cylinder hub 402A between upper flange 403A and lower flange 405A. The stiffener 400A has a height that extends partially down a height of the hub 402A. A locking member (not shown) may be positioned below a lower end 404 of the stiffener 400A. FIG. 4A provides a cross-sectional view of the arrangement in FIG. 3.

An inner surface 406 of the hub 402A is comprised of the inner surface 408 of the stiffener 400A and an inner surface 410 of the hub 402A below the stiffener 400A. A space formed by the inner surface 408 of the stiffener 400A has a diameter that is less than a diameter of the space formed by the inner surface 410 of the hub 402A. In this way, the inner surfaces 406 define a hollow space 401A delimited by a surface of revolution with circular cross sections of different diameters.

In FIG. 4B, the hollow cylinder stiffener 400B is positioned in the hollow cylinder hub 402B between the upper flange 403B and the lower flange 405B. The stiffener 400B extends the length of a height of the hub 402B and has an upper portion 412, forming a flange, extending inward toward the center of the hub 402B and a lower portion 414. A space in the hub 402B formed by the upper portion 412 has a diameter less than a diameter of a space formed in the hub 402B by the lower portion 414 of the stiffener 400B. In this way, the inner surface formed by the upper portion 412 and the lower portion 414 of the stiffener 400B forms a hollow space 401B delimited by a surface of revolution with circular cross sections of different diameters.

In FIG. 4C, the hollow cylinder stiffener 400C comprises a ring positioned in the hollow cylinder hub 402C at the upper end of the hub 402C between the upper flange 403C and lower flange 405C. The inner surface formed by the inner surface 416 of the hub and the inner surface 418 of the stiffener 400C defines a space 401C. The diameter resulting from the space formed by the inner surface 418 of the stiffener 400C is less than the diameter resulting from the space formed by the inner surface 416 of the hub 402C. In this way, the inner surface, formed of inner surfaces 416, 418, forms a hollow space 401C delimited by a surface of revolution with circular cross sections of different diameters.

In FIG. 4D, the hollow cylinder stiffener 400D comprises a tapered hollow cylinder that is positioned in the hollow cylinder hub 402D between the upper flange 403D and the lower flange 405D. The stiffener 400D extends the length of a height of the hub 402D. The upper end 420 of the stiffener 402D inner surface has a diameter 422 less than a diameter 424 of the inner surface at the lower end 426 of the stiffener 400D. The stiffener 400D provides greater support at the upper end 420 of the hub 402D which experiences greater stress than the lower end 426 because the lower end 426 is supported by the portion of the lower flange extending across the opening 424 at the lower end 426 of the hub 402D. An inner surface formed by the inner surface 428 of the stiffener 400D defines a hollow space 401D within the hub 402D delimited by a surface of revolution with circular cross sections of different diameters.

In the above configurations, the inner surface of the hollow cylinder stiffener 400D may form an open space having a diameter sufficient to allow the spring 216 to pass through to engage the locking member 214 and an outer surface diameter that is capable of fitting into the hub 208 and opening in the upper flange 204a.

FIG. 5 illustrates an embodiment of a bottom view of the lower flange 500 of a tape reel, such as the lower flange 204b of tape reel 204. The lower flange 500 has a plurality of cut-out portions $502_1$, $502_2$ . . . $502_6$ providing open spaces that reduce the rigidity of the lower flange 500 body relative to the upper flange. In alternative embodiments, there may be more or fewer of the cut-out portions $502_i$ with different shapes than shown. In one embodiment, the cut-out portions $502_i$ may be positioned round a circumference of an outer rim of the hub 208, represented by the circle 504. The lower flange 500 has a center opening 506. The cut-out portions $502_i$ reduce the rigidity of the lower flange 500 relative to the upper flange, thus reducing the stress on the tape pack resulting from the disparity in rigidity between the upper flange, such as 204a, and the lower flange 500, which in the embodiment of FIG. 5 has an opening 506 of smaller diameter than the center opening 205 in the upper flange 204a. Openings $502_1$ . . . $502_6$ may be formed in the lower flange 500 in number, arrangements and dimensions other than as shown in FIG. 5.

In further embodiments, the lower flange 500 having cut-out portions may be implemented with a hub having a hollow cylinder stiffener positioned therein as described above.

In the embodiments of FIGS. 4A, 4B, 4C, 4D, the lower flange does not have a center opening, whereas the upper flange 204a has a center opening 205, which results in a rigidity differential between the upper flange 204a and lower flange 204b that would result in the collapse or deformation of the upper end of the hub 208 at the upper flange 204a. In alternative embodiments, the lower flange 204b may have a center opening, such as opening 506 in FIG. 5, having a smaller diameter than the center opening 205 of the upper flange 204a. This disparity in upper and lower center openings would also cause the hub at the upper flange to collapse or deform.

FIG. 6 illustrates an embodiment of operations to form and assemble a tape reel 204 with a hollow cylindric stiffener, such as a stiffener having one of the configurations shown in FIGS. 2, 3, 4A, 4B, 4C, and 4D. Upon initiating (at block 600) the operation to form the tape reel 204, the upper flange 204a is attached (at block 602) to an upper end 210 of the hollow cylinder hub 208 such that the center hole of the upper flange 204a opens into the hollow cylinder hub 208. The upper flange 204a may be attached to the hub 208 using welding. A cylindrical locking member 214 is positioned (at block 604) within the hollow cylinder hub 208 to be positioned at the lower end of the hollow cylinder and adhere with adhesive on an outer surface of the locking member 214. The hollow cylinder stiffener 220 is positioned (at block 606) within the hollow cylinder hub 208 so that an upper end of the hollow cylinder stiffener is flush with the upper end 210 of the hollow cylinder hub 208. An adhesive may be used to adhere the outer surface of the hollow cylinder stiffener 220 to the inner surface of the hollow cylinder hub 208 In this way, an inner surface is formed within the hollow cylinder hub 208 and the hollow cylinder stiffener 220 extending from the upper 210 end of the hollow cylinder hub 208 to the lower end of the hollow cylinder hub 208. This inner surface forms a hollow cylinder space with circular cross sections of different diameters due to the presence of the hollow cylinder stiffener 220 position within the hub 208.

In an alternative method for forming the tape reel 204, the locking member 214 may be positioned in the hub 208 after the stiffener 220 is fastened to the hub 208 using an adhesive.

In the described embodiment, variables i, n, etc., when used with different elements may denote a same or different instance of that element.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Terms such as "top", bottom", "upper", "lower", "rear", "front", "back", "outer", "inner", "bottom", "left", and the like may be used for descriptive purposes only and are not to be construed as limiting. Embodiments may be manufactured, used, and contained in a variety of positions and orientations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape cartridge reel, comprising:
an upper flange;
a lower flange;
a hollow cylinder hub between the upper flange and the lower flange, wherein the upper flange has an upper opening at an upper end of the hollow cylinder hub;
a hollow cylinder stiffener separate from the upper flange and positioned within the hollow cylinder hub between the upper flange and the lower flange, wherein an upper end of the hollow cylinder stiffener does not extend past the upper flange; and
an inner surface formed within the hollow cylinder hub and the hollow cylinder stiffener and extending from the upper end of the hollow cylinder hub to a lower end of the hollow cylinder hub, wherein the inner surface forms a hollow space delimited by a surface of revolution with circular cross sections of different diameters, wherein an upper cross-section diameter of the hollow space at the upper end of the hollow cylinder hub comprises a smallest diameter of the hollow space.

2. The tape cartridge reel of claim 1, wherein the hollow cylinder stiffener comprises a ring positioned within the hollow cylinder hub at the upper end, wherein an inner diameter of the ring has a smaller diameter than an inner diameter of the hollow cylinder hub.

3. The tape cartridge reel of claim 1, wherein the hollow cylinder stiffener is formed of a stiffener material that is more rigid than a hub material forming the hollow cylinder hub.

4. The tape cartridge reel of claim 3, wherein the stiffener material comprises a metal and the hub material comprises a plastic.

5. The tape cartridge reel of claim 1, wherein the hollow cylinder stiffener extends from the upper end of the hollow cylinder hub toward the lower end of the hollow cylinder hub, and comprises:
an upper portion at the upper end of the hollow cylinder hub, wherein the upper portion has a first inner diameter; and
a lower portion that extends from the upper portion towards the lower end of the hollow cylinder hub, wherein the lower portion has a second inner diameter that is greater than the first inner diameter.

6. The tape cartridge reel of claim 1, further comprising:
a locking member positioned in the hollow cylinder hub, wherein the hollow cylinder stiffener extends from the upper end of the hollow cylinder hub to an upper surface of the locking member.

7. The tape cartridge reel of claim 1, wherein the hollow cylinder stiffener is tapered and has an upper diameter at the upper end of the hollow cylinder stiffener toward the upper end of the hollow cylinder hub and a lower diameter at a lower end of the hollow cylinder stiffener toward the lower end of the hollow cylinder hub, wherein the lower diameter is greater than the upper diameter.

8. The tape cartridge reel of claim 1, wherein the upper end of the hollow cylinder stiffener and an upper surface of the upper flange are coplanar.

9. A tape cartridge comprising:
a tape cartridge reel on which a tape medium is wound, comprising:
an upper flange;
a lower flange;
a hollow cylinder hub between the upper flange and the lower flange, wherein the upper flange has an upper opening at an upper end of the hollow cylinder hub; and
a hollow cylinder stiffener separate from the upper flange and positioned within the hollow cylinder hub between the upper flange and the lower flange, wherein an upper end of the hollow cylinder stiffener does not extend past the upper flange; and
an inner surface formed within the hollow cylinder hub and the hollow cylinder stiffener and extending from the upper end of the hollow cylinder hub to a lower end of the hollow cylinder hub, wherein the inner surface forms a hollow space delimited by a surface of revolution with circular cross sections of different diameters, wherein an upper cross-section diameter of the hollow space at the upper end of the hollow cylinder hub comprises a smallest diameter of the hollow space.

10. The tape cartridge of claim 9, wherein the hollow cylinder stiffener comprises a ring positioned within the hollow cylinder hub at the upper end, wherein an inner diameter of the ring has a smaller diameter than an inner diameter of the hollow cylinder hub.

11

11. The tape cartridge of claim 9, wherein the hollow cylinder stiffener is formed of a stiffener material that is more rigid than a hub material forming the hollow cylinder hub.

12. The tape cartridge of claim 11, wherein the stiffener material comprises a metal and the hub material comprises a plastic.

13. The tape cartridge of claim 9, wherein the hollow cylinder stiffener extends from the upper end of the hollow cylinder hub toward the lower end of the hollow cylinder hub, and comprises:

an upper portion at the upper end of the hollow cylinder hub, wherein the upper portion has a first inner diameter; and a lower portion that extends from the upper portion towards the lower end of the hollow cylinder hub, wherein the lower portion has a second inner diameter that is greater than the first inner diameter.

14. The tape cartridge of claim 9, further comprising:

a locking member positioned in the hollow cylinder hub, wherein the hollow cylinder stiffener extends from the upper end of the hollow cylinder hub to an upper surface of the locking member.

15. The tape cartridge of claim 9, wherein the hollow cylinder stiffener is tapered and has an upper diameter at the upper end of the hollow cylinder stiffener toward the upper end of the hollow cylinder hub and a lower diameter at a lower end of the hollow cylinder stiffener toward the lower end of the hollow cylinder hub, wherein the lower diameter is greater than the upper diameter.

16. The tape cartridge of claim 9, herein the upper end of the hollow cylinder stiffener and an upper surface of the upper flange are coplanar.

17. A method for forming a tape cartridge reel, comprising:

attaching an upper flange to a hollow cylinder hub attached to a lower flange, wherein the upper flange has an upper opening at an upper end of the hollow cylinder hub; and

positioning a hollow cylinder stiffener, separate from the upper flange, within the hollow cylinder hub between the upper flange and the lower flange, wherein an upper end of the hollow cylinder stiffener does not extend past the upper flange, wherein an inner surface is formed within the hollow cylinder hub and the hollow cylinder stiffener and extends from the upper end of the hollow cylinder hub to a lower end of the hollow cylinder hub, wherein the inner surface forms a hollow space delimited by a surface of revolution with circular cross sections of different diameters, wherein an upper cross-section diameter of the hollow space at the upper end of the hollow cylinder hub comprises a smallest diameter of the hollow space.

18. The method of claim 17, further comprising:

using an adhesive to adhere an outer surface of the hollow cylinder stiffener to a portion of the inner surface of the hollow cylinder hub.

19. The method of claim 17, further comprising:

positioning a cylindrical locking member within the hollow cylinder hub at the lower end of the hollow cylinder hub, wherein the hollow cylinder stiffener is positioned within the hollow cylinder hub after positioning the cylindrical locking member within the hollow cylinder hub.

20. The method of claim 17, wherein the hollow cylinder stiffener is positioned within the hollow cylinder hub to have the upper end of the hollow cylinder stiffener located flush with the upper end of the hollow cylinder hub.

21. The method of claim 17, wherein the hollow cylinder stiffener comprises a ring positioned within the hollow cylinder hub at the upper end of the hollow cylinder hub, wherein an inner diameter of the ring has a smaller diameter than an inner diameter of the hollow cylinder hub.

22. The method of claim 17, wherein the hollow cylinder stiffener is positioned within the hollow cylinder hub to have the upper end of the hollow cylinder stiffener coplanar with an upper surface of the upper flange.

* * * * *